United States Patent Office 3,586,513
Patented June 22, 1971

3,586,513
AERATED CONFECTIONS CONTAINING 5-15 D.E.
STARCH HYDROLYZATE
Harold Edwin Horn, Oak Lawn, Edward Richard Jensen, Hinsdale, and Bruce Alan Kimball, Chicago, Ill., assignors to CPC International Inc.
No Drawing. Filed Oct. 21, 1968, Ser. No. 769,425
Int. Cl. A23g 3/00
U.S. Cl. 99—134                    13 Claims

ABSTRACT OF THE DISCLOSURE

By replacing up to 70% of the protein whipping agent in a confection composition with a low D.E. starch hydrolysate having a D.E. of about 5 to about 25, whipped confections may be more quickly and economically produced.

This invention relates to aerated confections, whipping agent compositions used therein, and methods of making the same. More particularly, this invention relates to aerated confections wherein at least a portion of the protein whipping agent is replaced by a low D.E. starch hydrolysate.

Aerated confections are well known in the art. Generally speaking, and as used herein, the term "aerated confections" refers to an edible material comprised of at least one sweetener and a whipping agent, which material upon aeration increases in volume by entrapping air therein. The sweeteners employed are usually one or more sugars while the whipping agents employed are generally a protein material.

Examples of well known aerated confections include nougats, marshmallows, macaroons, whipped toppings, icings, chiffons, angel-food cakes, sponge cakes, whipped frozen desserts, fondant creams and the like. Examples of conventional whipping agents generally employed in these confections include the well known proteins such as vegetable, animal, and dairy proteins. Such proteins include albumin, gelatin, soy protein casein, whey, other milk products and the like. Preferably the proteins used are colloids which are also water soluble. Examples of conventional sweeteners employed include sugars generally, and more specifically, usually include sucrose, dextrose, maltose, corn syrup, mixtures thereof and the like.

Many methods have been developed by the art for making any particular type of aerated confection as listed above. For example, one universally preferred technique for making nougats comprises a first step of formulating two separate batches. The first batch, known as the frappe, is comprised of one or more whipping agents, a sweetener, such as corn syrup, and water. The frappe may optionally also include other sweetening ingredients such as invert syrup and sucrose. The second batch, known as the Bob, is comprised of various sweeteners, usually sugar in the form of dextrose, sucrose, lactose, levulose, maltose, mixtures of these sugars, and the like. Optionally, the Bob may also contain other ingredients such as corn syrup, inverted sugar, honey, and the like.

When atmospheric aeration is to be used such as when using a vertical planetary beater, horizontal mixer, or the like, the frappe is first beaten to a froth or foam. Into this beaten froth is then added with the beater still in motion, the Bob which has previously been heated to boiling in order to achieve the desired solids concentration. Generally heating is continued to a temperature above about 250° F. The heat from the Bob causes the whipping agent to partially coagulate and/or aggregate and thus allows the finished frappe to better retain its consistency. After all of the frappe and Bob are admixed, beating is continued until maximum volume is reached. If the addition of flavorings or powder sugar for graining or the like are desired, such additions take place after mixing of the frappe and Bob.

In those instances when aeration is accomplished by pressure beating such as with a conventional pressure wisk, the separately formed frappe and Bob may be added together prior to aeration and then aerated as a whole, under pressure. Both pressure and atmospheric aeration may be done in a continuous or batch form using appropriate equipment.

After aeration, the nougat composition is usually spread onto a cooling table, cut into the desired shape, and allowed to set by cooling it either at atmospheric temperatures, in a cooling chamber, or on a chilled slab.

Nougats produced by the above methods may be short, grained, or chewy in consistency, depending mainly upon the sugars and whipping agents employed. Examples of well known nougats capable of being produced by the above methods include soft short nougats, short nougats, semi-short nougats, semi-chewy nougats, hard short nougats, hard chewy nougats, fruit caramels, honey nougats, and the like.

Generally speaking, in order for nougats to be commercially acceptable and economically feasible, they must exhibit certain basic qualities. From the standpoint of commercial acceptability the final nougat product must pass the tests of taste, texture, body, and appearance. From a production and economic standpoint, the frappe must be readily and rapidly whippable to an acceptable volume and density regardless of whether it is prewhipped or pressure whipped after admixing the Bob therewith. In addition, the frappe foam or froth after whipping must be stable (i.e. no substantial amount of water must separate therefrom) and capable of holding an acceptable volume until the nougat is finally cooled and set. From a purely economic standpoint, the ingredients used in the frappe must not be so expensive as to make the final product unacceptably expensive to the consumer.

Another example of a method developed by the art to produce a particular aerated confection as listed hereinabove is the well established basic technique for making marshmallows. Such a technique usually comprises formulating a mixture comprised of sugar (e.g. cane or beet sugar), glucose (corn syrup), invert sugar, water, flavoring agent (e.g. vanilla), and whipping agent (usually a protein such as egg whites or gelatin), whipping the admixture into a foam, and casting the foam in warm, clean, dry starch. Three basic processes for accomplishing the above technique are well known in the art and are generally referred to as the cooked, semicooked, and cold process respectively. In all of these processes, the protein whipping agent used (e.g. gelatin) is usually first dissolved in water and then added to a hot (e.g. 240° F.), warm (e.g. 232° F.) or relatively cool (e.g. 170° F.) mixture of glucose, sugar, water, and invert sugar, depending upon the process used. The entire mixture, now referred to as the marshmallow syrup, is then beaten into a marshmallow foam and cast in warm, clean, dry starch. The temperature of the starch will depend upon the process used. Generally speaking the cold processes use starch temperatures of about 90° F. while the cooked and semi-cooked processes use starch temperatures of about 96° F.

To be commercially acceptable, marshmallows and all other whipped confections, like nougats, listed above, must exhibit the necessary levels of taste, body, texture and appearance. In addition, they must, like nougats and the other whipped confections listed above, be quickly whippable into a stable and lasting foam of acceptable volume and must not include as ingredients materials which are so expensive that the final product is unacceptable to the consumer.

Although the art has developed many techniques for providing relatively acceptable whipped confections from the standpoint of both quality and production economy, there is much room for improvement. That is to say, many of the best proteins conventionally used as whipping agents are extremely expensive, thus raising the cost of the final confection product. Many other whipping agents provide adequate, economic advantages but are relatively poor or only acceptable in providing body, texture, appearance, foam stability, volume, whippability, holding ability, etc. to the final product. Still other whipping agents, although acceptable as to the above criteria, give rise to side effects and other undesirable characteristics which detract from their otherwise high qualifications as whipping agents. It is therefore apparent that a need exists in the art for a whipping agent composition and whipped confections made therefrom which solve the above problems by providing a totally acceptable aerated confection to the industry.

It is an object of this inpention to fulfill the above-described need in the art.

It is another object of this invention to provide novel whipping agent compositions which may be used in whipped confections.

It is still another object of this invention to provide novel whipped confections to the art, which confections exhibit excellent body, texture, taste, and appearance; which are more economically produced than many heretofore conventional whipped confections; and which include therein a whipping agent composition that renders the confection readily and quickly whippable into a stable foam of good volume.

Other objects of the present invention will become apparent hereinafter from the following description and from the recital of the appended claims.

The basic whipping agent compositions as contemplated by this invention comprise a heretofore conventional whipping agent in combination with a low D.E. starch hydrolysate having a D.E. of about 5 to about 25. In practice, and when using these compositions in a whipped confection, the low D.E. starch hydrolysate is used to replace up to about 70% by weight of the conventional whipping agent. Preferably the hydrolysate replaces from about 5% to about 50% by weight of the conventional whipping agent and most preferably replaces about 15% by weight of the conventional whipping agent.

The whipping agents useful herein are well known in the art. Generally speaking, preferred whipping agents include proteins such as animal proteins, vegetable proteins, and dairy proteins. Examples of especially preferred proteins for use herein include albumin, gelatin, soy protein, and the like. Albumin may be provided by using dry or fresh whole eggs or egg whites either in dried, reconstituted, or whole form. Gelatin may be provided in any conventional form such as animal jelly or the like. In those instances when gelatin comprises all or a substantial portion of the whipping agent, the hydrolysate generally should not replace more than about 30–35% by weight of the conventional whipping agent.

The starch hydrolysates used in the whipping agent compositions of this invention are a relatively new class of starch materials. These starch hydrolysates are made by subjecting a source of starch to enzyme or acid treatment or a combination of both. It is important that the starch hydrolysate have a relatively low D.E. (dextrose equivalent) of say less than about 25 and most preferably have a D.E. in the range from 5 to 25. The most preferred materials have a D.E. within the range of 5 to 15. Starch hydrolysates of this type have been found to be excellent agents useful in reducing moisture pick-up of normally hygroscopic edible foods whereas use of other hydrolysates having a D.E. substantially outside this range results in inferior products which have a tendency to become sticky.

The term D.E. is used herein to refer to the reducing sugars content of the dissolved solids in a starch hydrolysate expressed as percent dextrose as measured by the Luff-Schoorl method (NBS Circular C–40, page 195 as appearing in "Polarimetry, Saccharimetry, and the Sugars" authors Frederick J. Bates and Associates).

The initial starch which is subjected to hydrolytic treatment may be derived from a wide variety of starchy materials such as cereal starches, waxy starches, and/or root starches. Typical of these groups are corn starch, potato starch, tapioca starch, grain sorghum starch, waxy milo starch, waxy maize starch, rice starch and the like. The term "starch hydrolysate" as used herein encompasses hydrolyzed starchy materials derived from a wide variety of starch sources known in the industry.

As hereinbefore stated, the starch hydrolysates preferred for use in the present invention are those having a D.E. ranging from about 5 to about 25 and which are made by any number of specific methods.

In one method, referred to as Method A in Example 1, a starch such as a waxy starch is treated with a single enzyme application of bacterial alpha amylase. More specifically, an aqueous slurry of a waxy starch, having a solids content less than 50%, is subjected to the hydrolytic action of bacterial alpha amylase under suitable conditions of fermentation to produce a starch hydrolysate. The hydrolysate may be further characterized as having the sum of the percentages (dry basis) of saccharides therein with a degree of polymerization of 1 to 6 divided by the D.E. to provide a ratio of at least about 2.0. This ratio is referred to as the characteristic or descriptive ratio. Those low D.E. products having a descriptive ratio less than about 2 are somewhat undesirable in that they exhibit less water solubility and also tend to form haze in solution as compared to those products with a ratio of at least 2.

The same product as described above, may also be made via a number of other routes. For example, a mixture of starch and water having a solids content less than 50% may be first subjected to the hydrolytic action of a bacterial alpha amylase followed by a high temperature heating step to solubilize any unsolubilized starch. Since this temperature tends to inactivate the enzyme it is then necessary to cool the solubilized partial hydrolysate and subject it to a second hydrolysis by treatment with additional bacterial alpha amylase to obtain the final starch hydrolysate. This method is referred to as Method B in Example 1.

A third method of making the preferred class of low D.E. starch hydrolysates, referred to as Method C in Example 1, consists of hydrolyzing a mixture of starch and water by the action of acid to reach a D.E. between about 5 and about 15. The partial hydrolysate is subsequently subjected to the action of bacterial alpha amylase to obtain a starch hydrolysate having a D.E. of from about 10 to about 25.

A particularly preferred starch hydrolysate useful in the present invention has the following specifications: moisture content about 5% maximum and a D.E. from about 10–13.

The term "whipping agent composition" is used herein to define the basic and unique combination of a conventional whipping agent and a low D.E. starch hydrolysate wherein the starch hydrolysate replaces a portion of the conventional whipping agent. It is, therefore, used to define a combination of ingredients which because of their presence allow the volume of a mass to increase upon aeration, despite interfacial surface tension. The basic composition therefore, may have added thereto other ingredients which serve or help to serve the same function. Examples of such other ingredients include using more than one well known whipping agent. In this respect, it is generally accepted that conventional whipping agents such as colloidal proteins allow aeration to take place because they are surface active molecules (or surfactants) and thus allow the interface between air and mass to increase despite interfacial tension. The exact function of the low D.E. starch hydrolysate is not precisely known. One belief forwarded is that it too serves as a whipping agent in that it also may act as a surfactant in the mass.

Such a belief seems to be borne out by the fact that such a high amount of hydrolysate is capable of being used in place of the known whipping agent, i.e. up to about 70% by weight thereof. In negation of this belief, however, and quite surprisingly, the low D.E. starch hydrolysate, when used alone or in amounts above about 70% in whipped confections, results in a dramatically inferior product. It would therefore appear that the novel whipping agent compositions of this invention are synergistic in nature and the results achieved by their use are not explainable as merely the combination of two whipping agents.

As alluded to hereinabove, the whipping agent compositions of this invention may be used in whipped confections generally. Examples of well known whipped confections are listed hereinabove, any one of which may be the recipient of the whipping agent compositions of this invention. Two preferred whipped confections formed in accordance with this invention are nougats and marshmallows. Although this invention is hereinafter more fully described with reference in the main to these two preferred types of whipped confections, it is understood that this invention contemplates all whipped confections within its scope.

Nougats, as described above, are basically formed of two portions, a frappe and a Bob. The frappe is generally comprised of water, a protein whipping agent such as egg whites or soy protein, and corn syrup. In accordance with this invention, many improved qualities of the final nougat may now be obtained by replacing up to about 70% of the normally used protein whipping agent with a low D.E. starch hydrolysate as described above. One typical technique by which this may be accomplished is as follows:

To about 0.5-3.0 lbs. of water there is added about 2-5 oz. whipping agent and about 1-4 lbs. corn syrup. The whipping agent used comprises from about 98%-30% by weight conventional protein such as a milk product whipping agent or fresh egg whites and from about 2%-70% by weight low D.E. starch hydrolysate having a D.E. of about 5 to 25. The mixture, known as the frappe, is whipped to peak volume using a Hobart mixer at No. 2 speed. A Bob batch comprising about 1-3 lbs. of corn syrup, 4-8 lbs. sucrose or the like are admixed by heating the Bob to boiling. The Bob is then slowly added to the frappe while mixing at No. 1 speed in the Hobart mixer. The whipped confection, now a nougat composition, is spread on a cooling table at a desired thickness, cut by a rotating knife and sent to a cooling tunnel for setting. The final nougat product exhibits good taste, body, texture, and appearance. In addition the frappe proves to be exceptionally stable and whippable in a comparative time to a good peak volume when compared to the same product using no replacement of whipping agent with hydrolysate. In addition, and especially when albumin is used as the conventional protein whipping agent, the cost of ingredients is sbustantially reduced. By varying the water content used to hydrate the whipping agent, type of protein whipping agent, flavoring materials, sugars, etc. in a known and conventional manner, nougats from soft to tough and chewy may be formulated.

Marshmallows as described above may be formulated by a wide variety of techniques. Generally speaking, it is preferred when producing this type of whipped confection to use gelatin as the conventional whipping agent. Thus, in accordance with this invention, not more than about 30-35% by weight of the gelatin should be replaced by low D.E. starch hydrolysate if the full benefits of this invention are to be realized.

A typical technique for making marshmallows according to this invention is to formulate a marshmallow syrup having the general composition, percentages being by weight, as follows:

| | Percent |
|---|---|
| (a) Cane or beet sugar | 15-60 |
| (b) Glucose, usually in the form of corn syrup | 20-30 |
| (c) Invert sugar; this sugar functions as a humectant and thus the precentage used is dictated by local geographic moisture conditions | 1-35 |
| (d) Water | 5-30 |
| (e) Baking soda; optionally added when necessary to maintain pH between about 5 to 6. pH's greater than 6 give rise to yellowing and bacteria | Trace |
| (f) Whipping agent composition comprised of at least 65% gelatin and up to 35% starch hydrolysate having a D.E. of 5-25 | 1-3 |

The marshmallow syrup consisting of the above ingredients may be formulated by either the cooked, semicooked, or cold process as hereinbefore described. For all of these processes the gelatin is pre-soaked for about 20 minutes in about one-half the indicated quantity of water. In the case of the cold process, the gelatin is dissolved in the water by means of a warm bath. The following processes are then conducted.

Cooked process.—Place sugar, invert sugar, glucose, and the rest of the indicated amount of water in a kettle and cook to above about 225° F. Cool the mixture to below about 160° F. and add thereto the soaked gelatin with stirring to form a marshmallow syrup.

Semicooked process.—Place the sugar, invert sugar, and the rest of the indicated amount of water into a kettle and cook to above about 225° F. Add the glucose to a beater and transfer the hot sugar from kettle to beater and mix thoroughly. Then add the soaked gelatin to the beater and mix to form a marshmallow syrup.

Cold process.—Place the glucose in a beater. Place a mixture of sugar, invert sugar, and the rest of the indicated amount of water (warmed) into a kettle, stir thoroughly, and heat to above about 150° F. to melt the sugar. Add the sugar syrup to the glucose in the beater with mixing. Add the gelatin solution and stir to form a marshmallow syrup.

The above-formulated syrups are then beaten in a conventional beater until a peak volume is achieved. During this beating various flavoring ingredients may be added.

The whipped marshmallow confection is then cast in warm, dry, clean starch. For the Cooked Process, Semicooked Process and Cold Process, starch temperatures are 95° to 98° F., 95° to 98° F., and 88° to 90° F. respectively. The marshmallow product is left in the starch until firm enough to handle easily whereinafter it is removed and dusted with 4X sugar.

General procedures applicable in this invention for making marshmallows are fully disclosed in the pamphlet "A Guide to Better Marshmallow Candy," Swift & Company, Gelatin Department, Kearny, N.J., the disclosure of which is incorporated herein by reference.

When marshmallows are formulated by the above techniques using the unique whipping agent compositions of this invention, generally superior products results both from the standpoint of commercial acceptability and economy.

The following examples serve to further illustrate this invention. As such they are not meant as limitations thereon.

EXAMPLE 1

The following specific procedures illustrate the above-described three basic methods for making the low D.E. starch hydrolysates used in this invention.

Method A.—One step enzyme technique

An aqueous starch slurry was prepared containing 30% solids by weight of waxy milo starch. The temperature of the slurry was raised and held between 85° C. and 92° C. A bacterial alpha amylase preparation was added in an amount just above 0.025% by weight of the starch over a period of slightly more than 30 minutes. The mixture was then held at the same temperature for an additional period of 30 minutes. The temperature was then reduced to below 80° C. and the conversion was allowed to continue until the desired D.E. was reached. The temperature of the mixture was then suddenly raised to about 120° C. in order to inactivate the enzyme and terminate the conversion.

Table 1 below sets forth typical saccharide analyses of low D.E. hydrolysates obtained in accordance with the above procedure. DP designates the degree of polymerization. $DP_1$ represents the total quantity expressed in percent by weight dry basis of monosaccharides present in the hydrolysate. $DP_2$ represents the total quantity of disaccharides present in the hydrolysate, and so forth.

TABLE 1.—TYPICAL SACCHARIDE ANALYSES

| | D.E. | | | | |
|---|---|---|---|---|---|
| | 5 | 10 | 15 | 20 | 25 |
| Hydrolysate composition: | | | | | |
| $DP_1$ | 0.1 | 0.3 | 0.7 | 1.4 | 2.4 |
| $DP_2$ | 1.3 | 3.4 | 5.5 | 7.6 | 9.7 |
| $DP_3$ | 1.8 | 4.3 | 6.9 | 9.4 | 12.0 |
| $DP_4$ | 1.8 | 3.5 | 5.2 | 6.9 | 8.6 |
| $DP_5$ | 1.8 | 3.6 | 5.5 | 7.4 | 9.3 |
| $DP_6$ | 3.3 | 7.0 | 10.6 | 14.3 | 18.0 |
| $DP_7$ and higher | 89.9 | 77.9 | 65.6 | 53.0 | 40.0 |
| Total $DP_{1 \to 6}$ | 10.1 | 22.1 | 34.4 | 47.0 | 60.0 |
| Descriptive ratio | 2.0 | 2.2 | 2.3 | 2.4 | 2.4 |

Method B.—Two step enzyme-enzyme technique

Unmodified corn starch was slurried in water to provide an aqueous suspension containing 28–32% by weight of the unmodified corn starch. The pH was at 7.5–8.0. To this mixture was added HT–1000 bacterial alpha amylase in an amount of 0.05% based on starch solids. This starch suspension was added over a 30 minutes period to an agitated tank maintained at a temperature of 90–92° C. After completion of starch addition, liquefaction was continued for 60 minutes, at which time the hydrolysate was within the D.E. range of 2 to 5. The liquefied starch was then heated to 150° C. and held at this temperature for 8 minutes. The heat treatment destroyed residual enzyme activity and resulted in improved filtration rates and in decreased yield losses upon filtration.

Further saccharification to the final D.E. was accomplished by the addition of more HT–1000 bacterial alpha amylase after cooling the liquefied starch hydrolysate to a suitable temperature for conversion. The liquefied starch was cooled to 80–85° C. and HT–1000 added in an amount of 0.02% by weight starch solids. After 14 to 20 hours of conversion the desired terminal D.E. of 20 was obtained.

The final starch hydrolysate product was analyzed and the following analytical values were obtained.

TABLE 2

| | |
|---|---|
| D.E. | 20.7 |
| $DP_1$ | 2.4 |
| $DP_2$ | 7.5 |
| $DP_3$ | 10.8 |
| $DP_4$ | 8.0 |
| $DP_5$ | 6.8 |
| $DP_6$ | 15.1 |
| $DP_{7+}$ | 49.4 |
| Descriptive ratio | 2.4 |

Method C.—Two step, acid-enzyme technique

Several samples of corn starch (A, B and C) were slurried in water providing slurries having Baumés ranging from 14° to 22°. These slurries were partially acid hydrolyzed to a maximum of 15 D.E. The particular D.E. achieved by acid hydrolysis in each of the samples is set forth in Table 3 below. After acid hydrolysis, the slurry was neutralized to a pH between 6 and 7. The neutralized liquor was cooled to between 80 and 85° C., and dosed with bacterial alpha amylase (HT–1000) in the quantity set forth below. A final D.E. of 19 to 21 was obtained in each of the samples in a period of time between 1 and 3 hours. The final conversion liquors are low in color. These liquors are easily refined and evaporated to about 42° Baumé to provide syrups. Dry products may also be obtained. Tables 3 and 4 below set forth the reaction conditions for conversion and the product analyses respectively.

TABLE 3.—ENZYME CONVERSION CONDITIONS

| Sample | D.E. of acid hydrolysate | Percent dry substance | Temp., °C. | pH | Enzyme dose | Time, hours | Final D.E. |
|---|---|---|---|---|---|---|---|
| A | 15.2 | 38 | 80 | 6.5 | 0.01 | 1 | 19.7 |
| B | 12.9 | 37.5 | 85 | 6.5 | 0.05 | 2 | 20.2 |
| C | 10.3 | 38.1 | 85 | 6.5 | 0.1 | 2 | 21.8 |

TABLE 4.—PRODUCT ANALYSES

| Sample | Final D.E. | Percent dry substance | $DP_1$ | $DP_2$ | $DP_3$ | $DP_4$ | $DP_5$ | $DP_6$ | $DP_{7+}$ | Descriptive ratio |
|---|---|---|---|---|---|---|---|---|---|---|
| A | 19.7 | 72 | 3.9 | 5.8 | 8.2 | 7.2 | 7.3 | 10.2 | 57.4 | 2.1 |
| B | 20.2 | 72 | 2.3 | 5.9 | 8.5 | 6.4 | 6.6 | 12.6 | 57.7 | 2.1 |
| C | 21.8 | 75 | 2.3 | 8.3 | 10.9 | 8.1 | 9.2 | 16.9 | 44.3 | 2.5 |

EXAMPLE 2

Various whipping agent compositions are formulated and aerated into nougat frappes. The frappes (i.e. foams) are evaluated for density by the weighed cup method in which the weight of foam in a container of known volume is measured. Foam stability is evaluated by the separation procedure which involves placing the foam in a 6-inch diameter funnel and measuring the milliliters of liquid separation after 30 minutes. The foams (frappes) are made by first reconstituting dry blends of spray dried egg whites and a low D.E. starch hydrolysaate made according to Example 1, Method A, and having substantially the same characteristics as listed for the 10 D.E. hydrolysate in Table 1, to an 11 percent (d.s.) solution. These solutions are then whipped as follows: A volume of 250 mls, of a solution is placed in a Hobart mixer and blended for 1½ minutes at 107 r.p.m. and 1½ minutes at 361 r.p.m. The foams are then evaluated using the aforementioned procedure with the following results:

TABLE 5.—FOAM CHARACTERISTICS

| Percent replacement [1] | 0 | 3 | 7 | 10 | 15 | 20 | 25 |
|---|---|---|---|---|---|---|---|
| Foam density (grams/ml.) | .0612 | .0617 | .0644 | .0664 | .0610 | .0659 | .0660 |
| Foam height (inches) | 5.3 | 5.3 | 5.0 | 4.9 | 5.8 | 5.2 | 5.1 |
| Foam separation (mls.) | 4.9 | 4.7 | 4.5 | 4.0 | 3.0 | 2.5 | 2.1 |

[1] Percent by weight, solids basis of hydrolysate replacement of egg whites. The foam whipping agent compositions used consist essentially of egg whites and hydrolysate.

As can be seen, the addition of increasing amounts of hydrolysate as a replacement for egg whites in a frappe foam materially increases the stability of the foam. This is evidenced by the decreasing amounts of liquid which separate from the foam as indicated in the last line of the above table.

All foam densities and foam heights are acceptable and all foams produced may be used in a nougat composition as above discussed. However, since the starch hydrolysate is only about one-tenth of the cost of egg whites, a significant economic advantage arises through replacement of egg whites with hydrolysates. Further attention is directed to the results indicated for 15% replacement of egg whites with hydrolysate. In addition to providing 40 percent more stability to a foam than if only egg whites are used, the foam whips more quickly and to a materially increased peak volume and lower density (higher fluff). When this whipping agent composition and foamed frappe made therefrom is used in nougates, substantially improved nougat candies and centers result.

EXAMPLE 3

Various marshmallow syrups are formulated using the basic semicooked process as described hereinabove. The sucrose is cooked to 235° F. with minimal water. The marshmallow syrups so formed consist of the following ingredients, all percentages being by weight:

|  | Percent |
|---|---|
| (a) Whipping agent, gelatin or mixture of gelatin and the hydrolysate used in Example 2 | As indicated |
| (b) Water | 7.5 |
| (c) Sucrose | 50.0 |
| (d) Glucose (corn syrup) | 36.0 |
| (e) Invert sugar syrup (conventional 50/50) | 4.2 |

The marshmallow syrups are then whipped in a Hobart mixer until peak volume is reached. Care is taken not to over-mix. The resulting foams are cast in a 96° F. clean, dry, powdered starch bed and the resulting marshmallows upon setting are evaluated for texture, body, and appearance. Levels of texture, body, and appearance for the marshmallows are rated on a scale of 1–3 as follows:

| Level | Texture | Body | Appearance |
|---|---|---|---|
| 1 | Good | Firm | Dry. |
| 2 | Fair | Slightly tender | Slightly tacky. |
| 3 | Poor | Extremely tender | Moist. |

The results of this evaluation appear as follows:

TABLE 6

|  | Control | A | B | C | 85/15 [1] | 75/25 [1] | 50/50 |
|---|---|---|---|---|---|---|---|
| Final product: |  |  |  |  |  |  |  |
| Percent gelatin (225 bloom) | 2.50 | 1.25 | 1.90 | 2.15 | 2.15 | 1.90 | 1.25 |
| Hydrolysate | 0 | 0 | 0 | 0 | 0.35 | 0.60 | 1.25 |
| Density (gms./cm.$^3$) | .486 | .571 | .505 | .495 | .500 | .514 | .605 |
| Evaluation: |  |  |  |  |  |  |  |
| Body | 1 | 3 | 2 | 1 | 1 | 1 | 3 |
| Texture | 1 | 3 | 2 | 1 | 1 | 2 | 3 |
| Appearance | 1 | 3 | 2 | 2 | 1 | 2 | 3 |

[1] Weight percent gelatin to weight percent hydrolysate in whipping agent composition consisting of gelatin and hydrolysate.

As can be seen from the above, when a hydrolysate is used in a 15% to 85% ratio with gelatin, a marshmallow results which is comparable in all respects to the control using an equivalent amount of whipping agent composition. This same marshmallow is superior in appearance to a marshmallow using as its whipping agent composition an equivalent amount of gelatin (control batch C). Furthermore, the addition of 0.60% hydrolysate to 1.90% gelatin increases the effectiveness of the final product by improving its body. Thus, the addition of hydrolysate is beneficial from both an economic and quality standpoint.

EXAMPLE 4

Various nougats are formed using a conventional atmospheric aerating process as described hereinabove. The hot Bob is added slowly to the whipped frappe and the mixture further whipped until peak volume is obtained. Equal size nougats are then prepared from the various mixtures and their densities are recorded. The nougat compositions by frappe and Bob are as follows:

FRAPPE

|  | Percent |
|---|---|
| (a) Whipping agent as indicated | 1.8 |
| (b) Water | 4.3 |
| (c) Vegetable fat | 2.6 |
| (d) Corn syrup | 21.1 |

BOB

|  |  |
|---|---|
| (a) Powdered sucrose | 1.6 |
| (b) Sucrose | 47.5 |
| (c) Corn syrup | 21.1 |

Four different whipping agent compositions are used in the above formulation and are evaluated. The results are as follows; densities being determined on an average of replicates:

TABLE 7.—REPLACEMENT OF EGG ALBUMIN

|  | Control | I | II | III | IIIA [1] | IV |
|---|---|---|---|---|---|---|
| Percent egg albumin | 100 | 100 | 70 | 50 | 50 | 50 |
| Percent hydrolysate | 0 | 0 | 30 | 50 | 50 | 50 |
| Grams water to hydrate blend | 40 | 80 | 40 | 40 | 40 | 80 |
| Density (gms./ml.) | .915 | .924 | .936 | 1.935 | 1.934 | .915 |

[1] The difference between trial III and IIIA is due to the fact that trial III is formulated from a 3 lb. batch while trial IIIA is formulated from a 15 lb. batch.

As can be seen, the replacement of albumin up to at least 50% in the whipping agent composition consisting of albumin and hydrolysate provides excellent densities. Sample IV equals the density of the control sample and yet contains twice as much water. Thus, an attendant advantage is the use of much larger quantities of water with at least comparable if not improved results. In all instances, acceptable to excellent nougats are formed. From a commercial standpoint, the nugats using hydrolysate are much preferred since, as hereinbefore stated, hydrolysate is only about one-tenth the cost of egg whites.

EXAMPLE 5

Using the same general formulation and procedure as set forth in Example 4, nougats are formed with a whipping agent composition of 50% soy protein and 50% hydrolysate (same as Example 4). The following results are recorded.

TABLE 8.—REPLACEMENT OF SOY PROTEIN

|  | I | II |
|---|---|---|
| Percent soy protein | 50 | 50 |
| Percent hydrolysate | 50 | 50 |
| Grams of water to hydrate blend | 40 | 80 |
| Density (gms./ml.) | 1.109 | .982 |

The above nougat densities are quite within acceptable limits. In addition, the above-resulting nougats are tough and chewy; characteristics very desirable in certain instances in the candy industry.

EXAMPLE 6

The following formulations, when processed according to techniques hereinabove described form various nougats according to this invention.

Formulation 1

9 oz. water
2.84 oz. dry egg albumin
2.0 oz. hydrolysate formed according to Example 1, Method B and having substantially the same characteristics as the hydrolysate in Table 2
4 lb. 13½ oz. corn syrup
6 lb. sucrose
5 oz. vegetable fat

Formulation 2

9 oz. water
3 oz. egg albumin (dry)
1 oz. hydrolysate formed according to Example 1, Method C and having substantially the same characteristics as Sample C in Table 4
5 lbs. corn syrup
6 lbs. sucrose
5 oz. vegetable fat

Formulation 3

9 oz. water
2.4 oz. egg albumin (dry)
1.6 oz. hydrolysate of Example 4
6 lb. corn syrup
6 lb. sucrose
5 oz. vegetable fat The above formulations all form slightly heavier nougats (i.e. less light) than nougats made using a whipping agent composition consisting only of 4.0 oz. dry egg albumin. However, all densities and levels of lightness are well within acceptable limits. In addition, the above formulations are substantially more economic to produce than an all egg albumin nougat and thus are more desirable.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:

1. A whipping agent composition comprising a protein and a low D.E. starch hydrolysate having a D.E. from about 5 to about 15 and a descriptive ratio of about 2.0, wherein said starch hydrolysate comprises from about 15% to about 70% by weight of the whipping agent composition.

2. A whipping agent composition according to claim 1 wherein said protein is selected from the group consisting of animal protein, vegetable protein, and dairy protein.

3. A whipping agent composition according to claim 1 wherein said protein is selected from the group consisting of gelatin, albumin, and soy protein.

4. A whipping agent composition according to claim 1 wherein said protein consists essentially of albumin and said starch hydrolysate comprises about 50% by weight of the whipping agent composition.

5. A frappe suitable for use in a whipped confection comprising a sweetener, water, and a whipping agent, said whipping agent containing a starch hydrolysate having a D.E. from about 5 to about 15 and a descriptive ratio of at least about 2.0 wherein said starch hydrolysate comprises from about 15% to about 70% by weight of the whipping agent.

6. A frappe according to claim 5 wherein the whipping agent is comprised of gelatin and a low D.E. starch hydrolysate having a D.E. from about 5 to about 15 and a descriptive ratio of at least about 2.0.

7. A frappe according to claim 5 wherein the whipping agent is comprised of egg albumin and a low D.E. starch hydrolysate having a D.E. from about 5 to about 15 and a descriptive ratio of at least about 2.0.

8. A whipped confection comprising a sweetener and a whipping agent composition, said whipping agent composition consisting essentially of a protein and a low D.E. starch hydrolysate having a D.E. from about 5 to about 15, said hydrolysate also characterized by having a descriptive ratio of at least about 2.0, said hydrolysate being present in an amount from about 15% to about 70% by weight of the total weight of the whipping agent composition.

9. A whipped confection according to claim 8 wherein said protein is selected from a group consisting of albumin, gelatin, and soy protein.

10. A whipped confection according to claim 8 wherein said protein consists essentially of gelatin and said hydrolysate comprises from about 15% to about 35% by weight of the whipping agent composition.

11. A whipped confection according to claim 8 wherein said protein consists essentially of albumin and said hydrolysate comprises from about 15% to about 70% by weight of the whipping agent composition.

12. A whipped confection according to claim 8 wherein said confection is a nougat.

13. A whipped confection according to claim 8 wherein said confection is a marshmallow.

References Cited

UNITED STATES PATENTS

| | | | |
|---|---|---|---|
| 2,522,050 | 9/1950 | Lenderink | 99—114 |
| 2,847,311 | 8/1958 | Doumak et al. | 99—134A |
| 2,954,299 | 9/1960 | Clausi et al. | 99—139 |
| 3,018,183 | 1/1962 | Downey | 99—134A |
| 3,490,922 | 1/1970 | Hurst | 99—142 |

JOSEPH M. GOLIAN, Primary Examiner

U.S. Cl. X.R.

99—139, 142; 195—31